(12) United States Patent
Patel et al.

(10) Patent No.: US 11,760,915 B2
(45) Date of Patent: Sep. 19, 2023

(54) METHOD OF APPLICATION OF SLIDING-RING POLYMERS TO ENHANCE ELASTIC PROPERTIES IN OIL-WELL CEMENT

(71) Applicant: Saudi Arabian Oil Company, Dhahran (SA)

(72) Inventors: Hasmukh A. Patel, Houston, TX (US); Peter Boul, Houston, TX (US); Carl Thaemlitz, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/675,429

(22) Filed: Feb. 18, 2022

(65) Prior Publication Data

US 2022/0169909 A1     Jun. 2, 2022

Related U.S. Application Data

(63) Continuation of application No. 16/593,820, filed on Oct. 4, 2019, now Pat. No. 11,279,864.

(51) Int. Cl.
| | |
|---|---|
| *E21B 33/14* | (2006.01) |
| *C09K 8/467* | (2006.01) |
| *C04B 24/24* | (2006.01) |
| *C04B 24/28* | (2006.01) |
| *C04B 24/32* | (2006.01) |
| *C04B 24/38* | (2006.01) |
| *C04B 28/02* | (2006.01) |
| *C04B 103/00* | (2006.01) |
| *C04B 103/40* | (2006.01) |

(52) U.S. Cl.
CPC ............. *C09K 8/467* (2013.01); *C04B 24/24* (2013.01); *C04B 24/285* (2013.01); *C04B 24/32* (2013.01); *C04B 24/383* (2013.01); *C04B 28/02* (2013.01); *E21B 33/14* (2013.01); *C04B 2103/0062* (2013.01); *C04B 2103/40* (2013.01)

(58) Field of Classification Search
CPC ................................ C09K 8/467; E21B 33/14
USPC ......................................................... 166/292
See application file for complete search history.

(56) References Cited

U.S. PATENT DOCUMENTS 7,273,100 B2 * 9/2007 Reddy .................... C09K 8/473
                                                                106/804
7,612,142 B2    11/2009 Ito et al.
(Continued)

FOREIGN PATENT DOCUMENTS

| CN | 109133754 | 1/2019 |
|---|---|---|
| JP | 2016088878 | 5/2016 |

OTHER PUBLICATIONS

PCT International Search Report and Written Opinion in International Appln. No. PCT/US2020/053962, dated Jan. 28, 2021, 13 pages.

(Continued)

*Primary Examiner* — Zakiya W Bates
*Assistant Examiner* — Ashish K Varma
(74) *Attorney, Agent, or Firm* — Fish & Richardson P.C.

(57) ABSTRACT

This document relates to methods for improving the tensile and elastic properties of cement of an oil well using cement compositions that contain sliding-ring polymer additives. The cement compositions containing the sliding-ring polymer additives exhibit increased stiffness while having a minimum impact on compressive strength, as compared to the same cement without the sliding-ring polymer additive.

29 Claims, 4 Drawing Sheets

(56) References Cited

U.S. PATENT DOCUMENTS

| | | |
|---|---|---|
| 7,622,527 B2 | 11/2009 | Ito et al. |
| 7,799,867 B2 | 9/2010 | Ito et al. |
| 7,847,049 B2 | 12/2010 | Ito et al. |
| 7,893,168 B2 | 2/2011 | Ito et al. |
| 7,943,718 B2 | 5/2011 | Ito et al. |
| 7,981,943 B2 | 7/2011 | Ito et al. |
| 8,007,911 B2 | 8/2011 | Ito et al. |
| 8,017,688 B2 | 9/2011 | Ito et al. |
| 8,450,415 B2 * | 5/2013 | Ito ................. C08B 37/0015 |
| | | 525/54.4 |
| 8,580,906 B2 | 11/2013 | Hayashi et al. |
| 9,068,051 B2 | 6/2015 | Yamasaki et al. |
| 9,266,972 B2 * | 2/2016 | Yamasaki ........... C08G 65/3331 |
| 10,060,242 B2 | 8/2018 | Benoit et al. |
| 2009/0312491 A1 | 12/2009 | Ito et al. |
| 2019/0203100 A1 * | 7/2019 | Contreras ............... C09K 8/493 |
| 2020/0325070 A1 * | 10/2020 | Patel ................... C04B 24/405 |

OTHER PUBLICATIONS asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

Harada et al., "Preparation and properties of inclusion complexes of polyethylene glycol with .alpha.-cyclodextrin," Macromolecules 1993, 26, 21, 5698-5703, 6 pages.

* cited by examiner

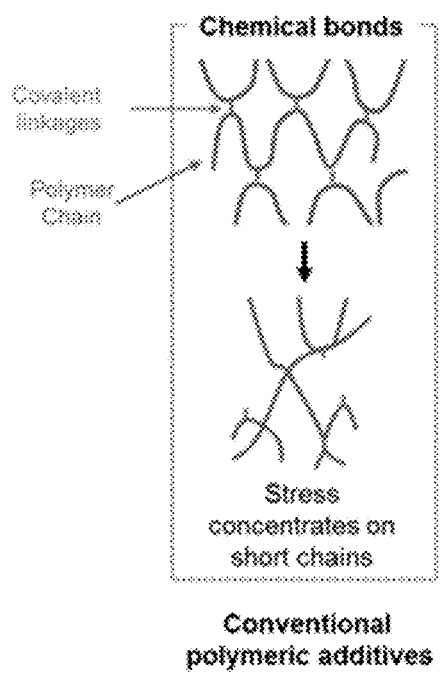
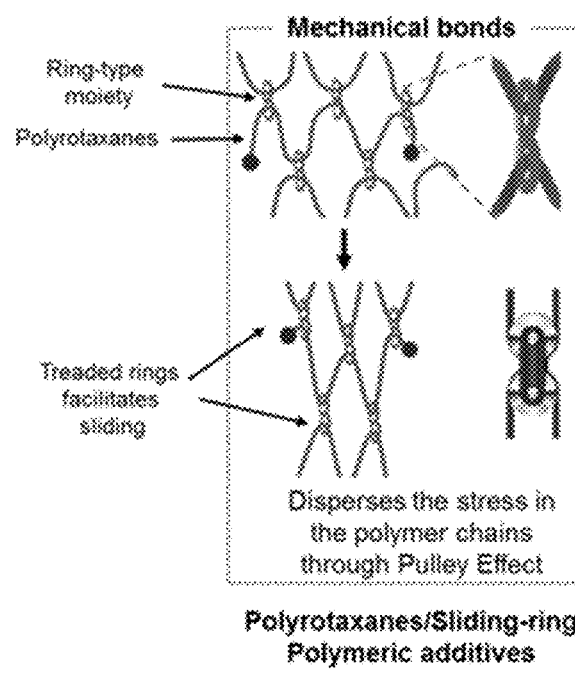
FIG. 1A
FIG. 1B

METHOD OF APPLICATION OF SLIDING-RING POLYMERS TO ENHANCE ELASTIC PROPERTIES IN OIL-WELL CEMENT

CROSS-REFERENCE TO RELATED APPLICATIONS

This application is a continuation of and claims the benefit of priority to U.S. patent application Ser. No. 16/593,820, filed on Oct. 4, 2019, the contents of which are hereby incorporated by reference.

TECHNICAL FIELD

This disclosure describes improvements to wellbore cements and methods for using such improved wellbore cements.

BACKGROUND

Well cementing is an important operation during drilling and completion of oil wells. The cement sheath must maintain well integrity behind the casing and provide long-term zonal isolation to ensure safety and prevent environmental problems. The cement placed in the annulus between the casing and the formation experiences frequent stresses, such as varying or extreme temperatures and pressures. These frequent stresses can deteriorate the mechanical properties of the cement over a period of time and lead to the formation and propagation of micro-cracks and fractures, thus affecting the production and increasing the cost of operation.

Since cement tends to fracture under downhole conditions due to the brittleness of the cement in its neat form, various polymeric or organic-inorganic hybrid material-based additives have been added to cements. Traditional polymeric additives typically do not have strong interactions with the cement particles and instead form weak, interfacial interactions and lack the ability to distribute stress. Such interactions can be separated or ruptured under stresses frequently encountered in downhole conditions, resulting in uneven distribution of stresses in the cement matrix and disruption of the polymer chains. Once the polymer chains are broken, the fracture can propagate in the cement and can eventually result in a reduction or loss of the mechanical properties necessary to sustain the downhole conditions. Thus, while these additives can improve the tensile properties of the cement, such additives tend to impart a significantly negative attribute to the cement in the form of a reduction in compressive strength.

Therefore, there is a need for additives and methods that improve the mechanical properties of cement, including the tensile and elastic properties, while having a minimum impact on the compressive strength, for adequate long-term zonal isolation in oil wells.

SUMMARY

Provided in this disclosure are sliding-ring polymer additives, cement compositions containing the additives, and methods for treating subterranean formations. The cement compositions containing the sliding-ring polymer additives exhibit increased stiffness and a reduction in fractures and the propagation of micro-cracks, without suffering a decrease in compressive strength, as compared to the same cement without the sliding-ring polymer additive. Also provided are methods of using such cement compositions in the long-term zonal isolation of oil wells.

Thus, provided in this disclosure is a cement composition that includes cement and a sliding-ring polymer additive containing at least two molecules of a polyrotaxane, where the polyrotaxane includes a linear polymer; at least one ring compound, wherein the linear polymer is threaded through the opening of the ring compound; and stopper groups disposed at both end terminals of the linear polymer; where at least one of the linear polymer and the ring compound is substituted with a hydrophobic group or a non-ionic group or combination thereof; and the at least two molecules of polyrotaxane are cross-linked to each other through a chemical bond. In some embodiments, the cement composition exhibits improved tensile strength as compared to the same composition without the sliding-ring polymer additive.

In some embodiments, the linear polymer is selected from the group consisting of polyvinyl alcohol, polyvinylpyrrolidone, poly(meth)acrylic acid, a cellulose-based resin, polyacrylamide, polyethylene oxide, polyethylene glycol, polypropylene glycol, a polyvinyl acetal-based resin, polyvinyl methyl ether, polyamine, polyethyleneimine, casein, gelatin, starch, a polyolefin-based resin, a polyester resin, a polyvinyl chloride resin, a polystyrene-based resin, an acrylic resin, a polycarbonate resin, a polyurethane resin, a vinyl chloride-vinyl acetate copolymer resin, a polyvinylbutyral resin, polyisobutylene, polytetrahydrofuran, polyaniline, acrylonitrile-butadiene-styrene copolymer (ABS resin), a polyamide, a polyimide, a polydiene, a polysiloxane, a polysulfone, a polyimine, a polyacetic anhydride, a polyurea, a polysulfide, a polyphosphazene, a polyketone, a polyphenylene, a polyhaloolefin; and derivatives and copolymers thereof. In some embodiments, the linear polymer is selected from the group consisting of polypropylene glycol, polytetrahydrofuran, polydimethylsiloxane, polyethylene and polypropylene copolymer, and polyethylene glycol. In some embodiments, the linear polymer is polyethylene glycol.

In some embodiments, the linear polymer has a molecular weight of about 2000 g/mol to about 50,000 g/mol, about 8000 g/mol to about 30,000 g/mol, about 15,000 g/mol to about 25,000 g/mol, or about 10,000 g/mol to about 50,000 g/mol. In some embodiments, the linear polymer has a molecular weight greater than about 10,000 g/mol, greater than about 20,000 g/mol, or greater than about 35,000 g/mol.

In some embodiments, the ring compound comprises one or more of an —OH group, an —NH$_2$ group, a —COOH group, an epoxy group, a vinyl group, a thiol group, a photo-crosslinkable group, and combinations thereof. In some embodiments, the photo-crosslinkable group is selected from the group consisting of cinnamic acid, coumarin, chalcone, anthracene, styrylpyridine, styrylpyridinium salt, and styrylquinolium salt.

In some embodiments, the ring compound is a cyclodextrin or cyclodextrin derivative. In some embodiments, the cyclodextrin is selected from the group consisting of α-cyclodextrin (α-CD), β-cyclodextrin (β-CD), and γ-cyclodextrin (γ-CD) and combinations thereof.

In some embodiments, the ring compound has an inclusion amount ranging from 0.001 to 0.61 relative to 1 which is the maximum inclusion amount of the ring compound capable of being included by the linear polymer.

In some embodiments, the stopper group is selected from the group consisting of a dinitrophenyl, a cyclodextrin, adamantane, trityl, a fluorescein, a pyrene, a substituted benzene, a polycyclic aromatic, and steroids. In some embodiments, the stopper group is adamantane or trityl.

In some embodiments, at least one of the linear polymer and the ring compound is substituted with a hydrophobic group or a non-ionic group or combination thereof. In some embodiments, the hydrophobic group is selected from the group consisting of alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments, the non-ionic group is selected from the group consisting of an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an —O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

In some embodiments, the ring compound is a cyclodextrin and a part or all of the hydroxyl groups (—OH) of the cyclodextrin is substituted with a hydrophobic group or non-ionic group or combination thereof. In some embodiments, substitution of the hydroxyl group with the hydrophobic group or non-ionic group or combination thereof is about 10% to about 100% of the total hydroxyl groups of the total cyclodextrin molecules.

In some embodiments, the at least two molecules of polyrotaxane are chemically bonded by a cross-linking agent. In some embodiments, the cross-linking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

In some embodiments, at least one hydroxyl group of at least one cyclodextrin molecule in each of the at least two molecules of polyrotaxane is involved in cross-linking.

In some embodiments, the sliding-ring polymer additive includes a polyrotaxane where the linear polymer is polyethylene glycol having a molecular weight of about 20,000 g/mol; the ring compound is a cyclodextrin wherein a part or all of the hydroxyl groups (—OH) of the cyclodextrin are substituted with a hydrophobic group or non-ionic group or combination thereof; and the stopper groups are adamantane. In some embodiments, a part or all of the hydroxyl groups (—OH) of the cyclodextrin are substituted with a polycaprolactone, a hydroxypropyl group, or both.

In some embodiments, the amount of sliding-ring polymer additive in the cement composition is between about 0.1% to about 6%, about 1% to about 4%, or about 2% to about 3% by weight of the cement composition. In some embodiments, the amount of sliding-ring polymer additive in the cement composition is about 1%, about 2%, or about 3% by weight of the cement composition.

In some embodiments, the cement composition contains a suspending agent. In some embodiments, the suspending agent is selected from the group consisting of a polymer, hydroxyethylcellulose, a polyacrylate, a hydrophilic polymer, a cellulose derivative, a block co-polymer of ethylene glycol and propylene glycol, and mixtures of these polymers. In some embodiments, the suspending agent is hydroxyethylcellulose sold as Natrosol™ (Ashland Specialty Ingredients, Wilmington, DE).

In some embodiments, the cement composition includes water. In some embodiments, the ratio of cement to water in the cement composition is about 50:50, about 60:40, or about 70:30 wt/v.

In some embodiments, the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments, the cement composition has a compressive strength of about 1000 psi to about 15,000 psi, about 2000 psi to about 10,000 psi, or about 6500 psi to about 8500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 7800 psi to about 9500 psi at a pressure of about 20 MPa and a temperature of about 180° F.

Also provided in the present disclosure is a method for preventing the formation of micro-cracks and fractures in the cement of an oil well, the method including providing to the oil well a cement composition containing cement and a sliding-ring polymer additive, the sliding-ring polymer additive containing a linear polymer; at least one ring compound, where the linear polymer is threaded through the opening of the ring compound; and stopper groups disposed at both end terminals of the linear polymer; where at least one of the linear polymer and the ring compound is substituted with a hydrophobic or non-ionic group or combination thereof; and at least two molecules of polyrotaxane are cross-linked to each other through a chemical bond.

In some embodiments of the method, the linear polymer is selected from the group consisting of polyvinyl alcohol, polyvinylpyrrolidone, poly(meth)acrylic acid, a cellulose-based resin, polyacrylamide, polyethylene oxide, polyethylene glycol, polypropylene glycol, a polyvinyl acetal-based resin, polyvinyl methyl ether, polyamine, polyethyleneimine, casein, gelatin, starch, a polyolefin-based resin, a polyester resin, a polyvinyl chloride resin, a polystyrene-based resin, an acrylic resin, a polycarbonate resin, a polyurethane resin, a vinyl chloride-vinyl acetate copolymer resin, a polyvinylbutyral resin, polyisobutylene, polytetrahydrofuran, polyaniline, acrylonitrile-butadiene-styrene copolymer (ABS resin), a polyamide, a polyimide, a polydiene, a polysiloxane, a polysulfone, a polyimine, a polyacetic anhydride, a polyurea, a polysulfide, a polyphosphazene, a polyketone, a polyphenylene, a polyhaloolefin; and derivatives and copolymers thereof. In some embodiments, the linear polymer is selected from the group consisting of polypropylene glycol, polytetrahydrofuran, polydimethylsiloxane, polyethylene and polypropylene copolymer, and polyethylene glycol. In some embodiments, the linear polymer is polyethylene glycol.

In some embodiments of the method, the linear polymer has a molecular weight of about 2000 g/mol to about 50,000 g/mol, about 8000 g/mol to about 30,000 g/mol, about 15,000 g/mol to about 25,000 g/mol, or about 10,000 g/mol to about 50,000 g/mol. In some embodiments, the linear polymer has a molecular weight greater than about 10,000 g/mol, greater than about 20,000 g/mol, or greater than about 35,000 g/mol.

In some embodiments of the method, the ring compound comprises one or more of an —OH group, an —NH$_2$ group, a —COOH group, an epoxy group, a vinyl group, a thiol group, a photo-crosslinkable group, and combinations thereof. In some embodiments, the photo-crosslinkable group is selected from the group consisting of cinnamic acid, coumarin, chalcone, anthracene, styrylpyridine, styrylpyridinium salt, and styrylquinolium salt.

In some embodiments of the method, the ring compound is a cyclodextrin or cyclodextrin derivative. In some embodiments, the cyclodextrin is selected from the group consisting of α-cyclodextrin (α-CD), β-cyclodextrin (β-CD), and γ-cyclodextrin (γ-CD) and combinations thereof.

In some embodiments of the method, the ring compound has an inclusion amount ranging from 0.001 to 0.61 relative to 1 which is the maximum inclusion amount of the ring compound capable of being included by the linear polymer.

In some embodiments of the method, the stopper group is selected from the group consisting of a dinitrophenyl, a cyclodextrin, adamantane, trityl, a fluorescein, a pyrene, a substituted benzene, a polycyclic aromatic, and steroids. In some embodiments, the stopper group is adamantane or trityl.

In some embodiments of the method, at least one of the linear polymer and the ring compound is substituted with a hydrophobic group or a non-ionic group or combination thereof.

In some embodiments, the hydrophobic group is selected from the group consisting of alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments of the method, the non-ionic group is selected from the group consisting of an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an —O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—Si—R$^3$ group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

In some embodiments of the method, the ring compound is a cyclodextrin and a part or all of the hydroxyl groups (—OH) of the cyclodextrin is substituted with a hydrophobic group or non-ionic group or combination thereof. In some embodiments, substitution of the hydroxyl group with the hydrophobic group or non-ionic group or combination thereof is about 10% to about 100% of the total hydroxyl groups of the total cyclodextrin molecules.

In some embodiments of the method, the at least two molecules of polyrotaxane are chemically bonded by a cross-linking agent. In some embodiments, the cross-linking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

In some embodiments of the method, at least one hydroxyl group of at least one cyclodextrin molecule in each of the at least two molecules of polyrotaxane is involved in cross-linking.

In some embodiments of the method, the sliding-ring polymer additive includes a polyrotaxane where the linear polymer is polyethylene glycol having a molecular weight of about 20,000 g/mol; the ring compound is a cyclodextrin wherein a part or all of the hydroxyl groups (—OH) of the cyclodextrin are substituted with a hydrophobic group or non-ionic group or combination thereof; and the stopper groups are adamantane. In some embodiments, a part or all of the hydroxyl groups (—OH) of the cyclodextrin are substituted with a polycaprolactone, a hydroxypropyl group, or both.

In some embodiments of the method, the amount of sliding-ring polymer additive in the cement composition is between about 0.1% to about 6%, about 1% to about 4%, or about 2% to about 3% by weight of the cement composition. In some embodiments, the amount of sliding-ring polymer additive in the cement composition is about 1%, about 2%, or about 3% by weight of the cement composition.

In some embodiments of the method, the cement composition contains a suspending agent. In some embodiments, the suspending agent is selected from the group consisting of a polymer, hydroxyethylcellulose, a polyacrylate, a hydrophilic polymer, a cellulose derivative, a block co-polymer of ethylene glycol and propylene glycol, and mixtures of these polymers. In some embodiments, the suspending agent is hydroxyethylcellulose sold as Natrosol™ (Ashland Specialty Ingredients, Wilmington, DE).

In some embodiments of the method, the cement composition includes water. In some embodiments, the ratio of cement to water in the cement composition is about 50:50, about 60:40, or about 70:30 wt/v.

DESCRIPTION OF DRAWINGS

FIGS. 1A-1B illustrate the mechanism of stress distribution in conventional polymeric additives (FIG. 1A) and sliding-ring polymer additives (FIG. 1B).

FIG. 2A shows pristine cement; FIG. 2B shows cement under stress; FIG. 2C shows recovering cement; and FIG. 2D shows recovered cement.

DETAILED DESCRIPTION

Figure 2A:
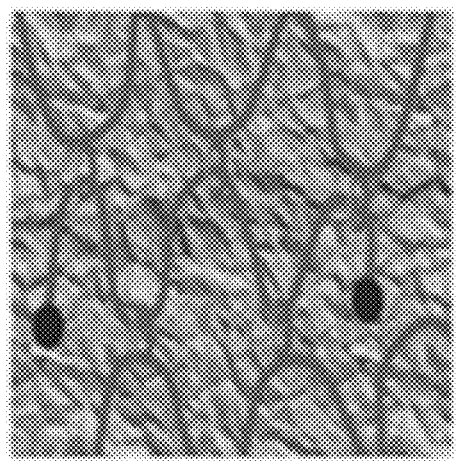
FIGS. 2A-2D illustrate the sliding motion of movable cross-links in the sliding-ring polymer additives, where the cross-links between two ring compounds can slide along the polymer chains, providing a pulley effect to equalize the internal stresses in the cement. The sliding motion of the movable cross-links improves the resistance to micro-cracks and protects the cement from substantial fractures.
Figure 2B:
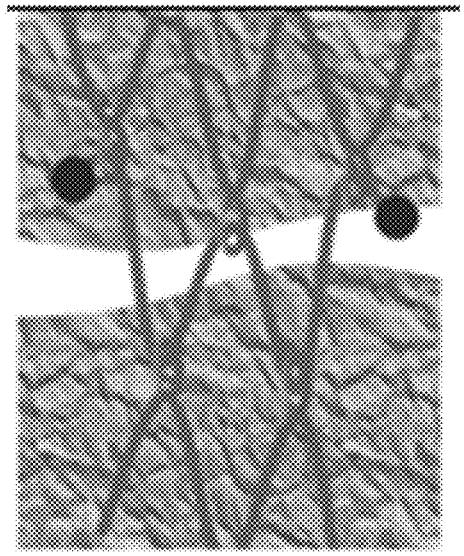
Figure 2C:
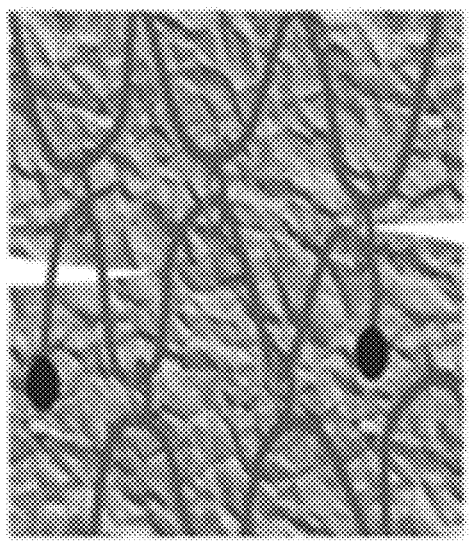
Figure 2D:
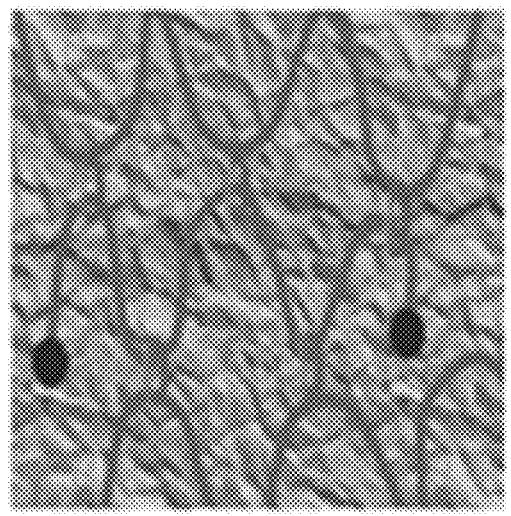

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present application provides compositions, such as cement compositions containing sliding-ring polymer additives, and methods for improving the stiffness and elastic properties of cement while having minimum impact on the compressive strength. The cement compositions of the present disclosure contain sliding-ring polymer additives that include chemical structures called polyrotaxanes. The polyrotaxanes are made up of a linear polymer, a modified or substituted ring compound, and stopper groups on the end terminals of the linear polymer, and at least two molecules of the polyrotaxane are cross-linked to each other through a chemical bond. The cross-linked mechanical bond is movable, which allows the polymer chains to slide within the material. This is unlike conventional polymeric additives that contain permanently-linked covalent bonds that restrict the motion of the polymer chains. Without wishing to be bound by any particular theory, it is believed that the functional groups on the surface of the ring compounds, for example, hydroxyl groups (—OH) on a cyclodextrin, allow for strong bonding between cement particles and the sliding-ring polymers, providing a strong interface within the cement. Furthermore, mechanical linkages (movement of ring components within polymeric networks) facilitate distribution of forces unlike chemical linkages (restricted movement of polymer chains in polymer networks) where cleavage of bonds can occur due to repeated cycles of forces.

In addition to enhancing stress distribution in cement, the sliding-ring polymeric additives of the present disclosure provide the ability to restrict the propagation of micro-cracks and thus resist the failure of the mechanical properties of the set cement. As shown in FIG. 1A, the cross-links between polymeric chains of traditional covalently linked polymeric additives eventually break under repeated stress under downhole conditions, as the stresses are concentrated on the short chains. By contrast, as shown in FIG. 1B, the mechanical cross-links of the presently disclosed sliding-ring polymer structures remain intact after experiencing stress. The molecular level effects originating from the sliding motion through threaded rings, a pulley effect, result in uniform dispersion of stresses in the cement matrix. The blending of sliding-ring polymers in the cement imparts the improvement in the mechanical properties, especially stiffness. Due to the sliding motion of the polyrotaxanes, the addition of these additives into cement thus improves the distribution of stresses throughout the matrix of set cement and restricts the formation and propagation of micro-cracks and fractures generated under extreme conditions (FIGS. 2A-2D).

Thus, the materials described in the present disclosure restrict the formation of micro-cracks, propagation of fracture, and improve the stiffness and tensile properties of the set cement.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axle.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present application.

As used in this disclosure, the term "set" can mean the process of a fluid slurry (for example, a cement slurry) becoming a hard solid. Depending on the composition and the conditions, it can take just a few minutes up to 72 hours or longer for some cement compositions to initially set.

"Mechanical properties" of cement refer to the properties that contribute to the overall behavior of the cement when subjected to an applied force, such as the frequent stresses cement is exposed to that impact its ability to both protect the casing and maintain zonal isolation. Mechanical properties of cement include compressive strength, elastic strength or the elastic modulus (that is, Young's Modulus), Poisson's ratio (the ratio of lateral strain to longitudinal strain in a material subjected to loading), and tensile strength.

The term "compressive strength" or "compression strength" refer to the measure of the cement's ability to resist loads which tend to compress it or reduce size. Cement composition compressive strengths can vary from 0 psi to over 10,000 psi (0 to over 69 MPa). Compressive strength is generally measured at a specified time after the composition has been mixed and at a specified temperature and pressure. In some embodiments, compressive strength is measured by a non-destructive method that continually measures correlated compressive strength of a cement composition sample throughout the test period by utilizing a non-destructive sonic device. For example, compressive strength of a cement composition can be measured using the non-destructive method according to ANSI/API Recommended Practice 10-B2 at a specified time, temperature, and pressure.

"Elastic strength," as used in this disclosure, describes the ability of the cement to resist permanent deformation when force is applied. Elastic strength is also referred to as Young's Modulus.

The term "tensile strength," as used in this disclosure, describes the ability of the cement to resist breaking while being subjected to tension forces. "Improved tensile properties" means an increase in the tensile strength of the cement or cement composition being referred to.

As used in this disclosure, "zonal isolation" means the prevention of fluids, such as water or gas, in one zone of a well or subterranean formation, from mixing with oil in another zone.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Cement Compositions Containing Sliding-Ring Polymers

Provided in this disclosure is a cement composition containing cement and a sliding-ring polymer additive, for example, a sliding-ring polymer additive of the present disclosure, that exhibits improved mechanical properties, for example, improved stiffness, improved tensile properties, or both, as compared to the same cement composition that does not contain the sliding-ring polymer additive. In some embodiments, the sliding-ring polymer additive improves the distribution of stresses throughout the cement matrix and restricts the formation and propagation of micro-cracks and fractures generated under extreme conditions. In some embodiments, the cement composition contains one or more additional agents, such as a suspending agent, an anti-foaming agent, or both. In some embodiments, the composition contains water.

Sliding-Ring Polymer Additives

Provided in this disclosure are sliding-ring polymer additives that are made up of at least two molecules of a polyrotaxane that are cross-linked to each other through a chemical bond, where the polyrotaxane contains a linear polymer and at least one ring compound, where the linear polymer is threaded through the opening of the ring compound, and stopper groups disposed at both end terminals of the linear polymer. In some embodiments, at least one of the linear polymer and the ring compound is substituted with a hydrophobic or non-ionic group or combination thereof.

Sliding-ring polymers are produced through host-guest chemical routes. In this approach, ring-type organic compounds are loaded on to a linear polymeric chain and the inclusion or threaded compounds obtained are subjected to the end-capping by bulkier chemical moieties to restrict the ring-type compounds from de-thread. The materials obtained are called polyrotaxanes. In some embodiments, the surfaces of the ring-type compounds in polyrotaxanes are chemically modified so that they can be cross-linked with high molecular weight polymeric materials, to generate sliding-ring polymers.

Any sliding-ring polymer known in the art can be used as an additive in the cement compositions of the present disclosure. For example, any sliding-ring polymer that improves the elastic properties of cement and protect the cement from fractures can be used. In some embodiments, the sliding-ring polymer additive is a sliding-ring polymer additive as described in the present disclosure, for example, a sliding-ring polymer additive that includes at least two molecules of a polyrotaxane that are made up of a linear polymer, at least one ring compound, and stopper groups disposed at the end terminals of the linear polymer. In some embodiments, the sliding-ring polymer additive is an additive or polyrotaxane moiety as described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

Commercially available sliding-ring polymers can also be used in the cement compositions of the present disclosure. In some embodiments, the sliding-ring polymer additive is a sliding-ring polymer or polyrotaxane manufactured by Advanced Softmaterials Inc. (Chiba, Japan). Examples of commercially available sliding-ring polymers and polyrotaxanes manufactured by Advanced Softmaterials, Inc. are those sold under the name SeRM®. Examples of such products include, but are not limited to, SeRM® Super Polymer SH3400P, SH2400P, SH1310P, SM3405P, SM1315P, SA3405P, SA2405P, SA1315P, SH3400C, SA3400C, SA2400C. For example, SeRM® SH2400P is a polyrotaxane having a cyclodextrin, at least a part of the hydroxyl groups of the cyclodextrin being modified with a caprolactone chain via an —O—$C_3H_6$—O— group, a linear molecule of polyethylene glycol and a blocking group of an adamantyl group; a molecular weight of linear polymer of about 20,000 g/mol; a hydroxyl value of polyrotaxane of 76 mg KOH/g; a total molecular weight of polyrotaxane of about 400,000 g/mol. Another example of such a compound is the SeRM® Super Polymer SH3400P, which is a modified polyrotaxane-graft-polycaprolactone (CAS No. 928045-45-8) having polyethylene glycol as the linear polymer, adamantane groups as the stopper groups, and α-cyclodextrins having a hydroxyl group as the ring compound. Other examples of commercially available products of a mixture of a polyrotaxane and a cross-linking agent include SeRM® Elastomer 51000 and M1000. In some embodiments, the sliding-ring polymer additive is an SeRM® Super Polymer. In some embodiments, the SeRM® Super Polymer is of the SH Series. In some embodiments, the SeRM® Super Polymer is of the SA Series. In some embodiments, the SeRM® Super Polymer is of the SM Series. In some embodiments, the additive is a SeRM® Micro Ball, which is a cross-linked microparticle containing the SeRM® Super Polymer. In some embodiments, the additive is SeRM® SH2400B-0501.

In some embodiments, the sliding-ring polymer additive includes a polyrotaxane where the linear polymer is polyethylene glycol having a molecular weight of about 20,000 g/mol; the ring compound is a cyclodextrin where a part or all of the hydroxyl groups (—OH) of the cyclodextrin are substituted with a hydrophobic group or non-ionic group or combination thereof; and the stopper groups are adamantane. In some embodiments, a part or all of the hydroxyl groups (—OH) of the cyclodextrin are substituted with a polycaprolactone, a hydroxypropyl group, or both.

Linear Polymers

The linear polymer that can be included in a polyrotaxane can be any linear polymer that can be included in a ring compound such that the linear polymer is threaded through the opening of the ring compound. Any linear polymer that can be threaded through the opening of a ring compound can be included in a polyrotaxane. Examples of such linear polymers include those described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

Examples of the suitable linear polymers include, but are not limited to, polyvinyl alcohol, polyvinylpyrrolidone, poly(meth)acrylic acid, cellulose-based resins (for example, carboxymethylcellulose, hydroxyethylcellulose, and hydroxypropylcellulose), polyacrylamide, polyethylene oxide, polyethylene glycol, polypropylene glycol, polyvinyl acetal-based resins, polyvinyl methyl ether, polyamine, polyethyleneimine, casein, gelatin, starch and copolymers thereof, polyolefin-based resins (for example, polyethylene, polypropylene, and copolymer resins with other olefinic monomers), polyester resins, polyvinyl chloride resins, polystyrene-based resins (for example, polystyrene and acrylonitrile-styrene copolymer resin), acrylic resins (for example, polymethyl methacrylate, copolymers of (meth)acrylate, acrylonitrile-methyl acrylate copolymer resin), polycarbonate resins, polyurethane resins, vinyl chloride-vinyl acetate copolymer resin, polyvinylbutyral resin, polyisobutylene, polytetrahydrofuran, polyaniline, acrylonitrile-butadiene-styrene copolymer (ABS resin), polyamides (for example, nylon), polyimides, polydienes (for example, polyisoprene and polybutadiene), polysiloxanes (for example, polydimethylsiloxane), polysulfones, polyimines, polyacetic anhydrides, polyureas, polysulfides, polyphosphazenes, polyketones, polyphenylenes, polyhaloolefins; and copolymer and derivatives thereof. In some embodiments, the linear polymer is selected from the group consisting of polypropylene glycol, polytetrahydrofuran, polydimethylsiloxane, polyethylene and polypropylene. In some embodiments, the linear polymer is polyethylene glycol.

In some embodiments, the linear molecule has a molecular weight of about 2000 g/mol to about 50,000 g/mol, for example, about 2000 g/mol to about 45,000 g/mol, about 2000 g/mol to about 40,000 g/mol, about 2000 g/mol to about 35,000 g/mol, about 2000 g/mol to about 30,000 g/mol, about 2000 g/mol to about 25,000 g/mol, about 2000 g/mol to about 20,000 g/mol, about 2000 g/mol to about 15,000 g/mol, about 2000 g/mol to about 10,000 g/mol, about 2000 g/mol to about 8000 g/mol, about 2000 g/mol to about 5000 g/mol, about 5000 g/mol to about 50,000 g/mol, about 5000 g/mol to about 45,000 g/mol, about 5000 g/mol to about 40,000 g/mol, about 5000 g/mol to about 35,000 g/mol, about 5000 g/mol to about 30,000 g/mol, about 5000 g/mol to about 25,000 g/mol, about 5000 g/mol to about 20,000 g/mol, about 5000 g/mol to about 15,000 g/mol, about 5000 g/mol to about 10,000 g/mol, about 5000 g/mol to about 8000 g/mol, about 8000 g/mol to about 50,000 g/mol, about 8000 g/mol to about 45,000 g/mol, about 8000 g/mol to about 40,000 g/mol, about 8000 g/mol to about 35,000 g/mol, about 8000 g/mol to about 30,000 g/mol, about 8000 g/mol to about 25,000 g/mol, about 8000 g/mol to about 20,000 g/mol, about 8000 g/mol to about 15,000 g/mol, about 8000 g/mol to about 10,000 g/mol, about 10,000 g/mol to about 50,000 g/mol, about 10,000 g/mol to about 45,000 g/mol, about 10,000 g/mol to about 40,000 g/mol, about 10,000 g/mol to about 35,000 g/mol, about 10,000 g/mol to about 30,000 g/mol, about 10,000 g/mol to about 25,000 g/mol, about 10,000 g/mol to about 20,000 g/mol, about 10,000 g/mol to about 15,000 g/mol, about 15,000 g/mol to about 50,000 g/mol, about 15,000 g/mol to about 45,000 g/mol, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 15,000 g/mol to about 20,000 g/mol, about 20,000 g/mol to about 50,000 g/mol, about 20,000 g/mol to about 45,000 g/mol, about 20,000 g/mol to about 40,000 g/mol, about 20,000 g/mol to about 35,000 g/mol, about 20,000 g/mol to about 30,000 g/mol, about 20,000 g/mol to about 25,000 g/mol, about 25,000 g/mol to about 50,000 g/mol, about 25,000 g/mol to about 45,000 g/mol, about 25,000 g/mol to about 40,000 g/mol, about 25,000 g/mol to about 35,000 g/mol, about 25,000 g/mol to about 30,000 g/mol, about 30,000 g/mol to about 50,000 g/mol, about 30,000 g/mol to about 45,000 g/mol, about 30,000 g/mol to about 40,000 g/mol, about 30,000 g/mol to about 35,000 g/mol, about 35,000 g/mol to about 50,000 g/mol, about 35,000 g/mol to about 45,000 g/mol, about 35,000 g/mol to about 40,000 g/mol, about 40,000 g/mol to about 50,000 g/mol, about 40,000 g/mol to about 45,000 g/mol, about 45,000 g/mol to about 50,000 g/mol, or about 2000 g/mol, about 5000 g/mol, about 8000 g/mol, about 10,000 g/mol, about 15,000 g/mol, about 20,000 g/mol, about 25,000 g/mol, about 30,000 g/mol, about 35,000 g/mol, about 40,000 g/mol, about 45,000 g/mol, or about 50,000 g/mol. In some embodiments, the molecular weight of the linear molecule is about 2000 g/mol to about 50,000 g/mol. In some embodiments, the molecular weight of the linear molecule is about 8000 g/mol to about 30,000 g/mol. In some embodiments, the molecular weight of the linear molecule is about 15,000 g/mol to about 25,000 g/mol. In some embodiments, the molecular weight of the linear molecule is greater than about 10,000 g/mol. In some embodiments, the molecular weight of the linear molecule is greater than about 20,000 g/mol. In some embodiments, the molecular weight of the linear molecule is greater than about 35,000 g/mol.

Ring Compounds

The ring compound that can be included in a polyrotaxane can be any ring compound that allows for threading of a linear polymer through the opening of the ring. Examples of such ring compounds include those described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

In some embodiments, the ring compound comprises one or more of an —OH group, an —NH$_2$ group, a —COOH group, an epoxy group, a vinyl group, a thiol group, a photo-crosslinkable group, and combinations thereof. In some embodiments, the photo-crosslinkable group is selected from the group consisting of cinnamic acid, coumarin, chalcone, anthracene, styrylpyridine, styrylpyridinium salt, and styrylquinolium salt.

In some embodiments, the ring compound is a cyclodextrin or a cyclodextrin derivative. Examples of suitable ring compounds include, but are not limited to, α-cyclodextrin (α-CD), β-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 m), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)-β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β- cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

In some embodiments, the ring compound is α-cyclodextrin having the structure:

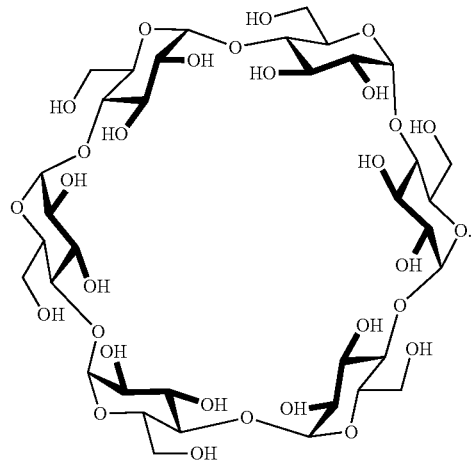 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@H](O[C@@H]7C(CO)O[C@H](O[C@H]1[C@H](O)[C@H]2O)[C@H](O)[C@H]7O)[C@H](O)[C@H]6O)[C@H](O)[C@H]5O)[C@H](O)[C@H]4O)[C@H](O)[C@H]3O]

In some embodiments, the ring compound is β-cyclodextrin having the structure:

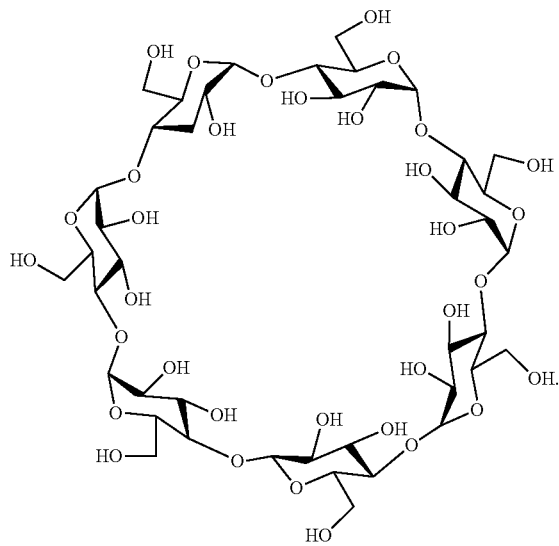 [SMILES: OCC1O[C@@H]2O[C@@H]3C(CO)O[C@H](O[C@@H]4C(CO)O[C@@H](O[C@@H]5C(CO)O[C@@H](O[C@@H]6C(CO)O[C@H](O[C@@H]7C(CO)O[C@H](O[C@H]8CC(O)[C@H](OC8CO)O[C@H]1C(O)C2O)C(O)C7O)C(O)C6O)C(O)C5O)C(O)C4O)C(O)C3O]

In some embodiments, the ring compound is γ-cyclodextrin having the structure:

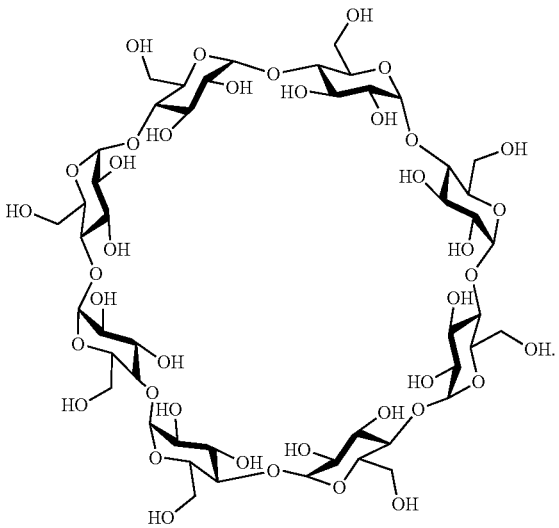 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@H](O[C@@H]7C(CO)O[C@H](O[C@@H]8C(CO)O[C@@H](O[C@@H]9C(CO)O[C@H](OC1[C@@H](O)C2O)C(O)[C@H]9O)C(O)[C@H]8O)C(O)[C@H]7O)C(O)[C@H]6O)C(O)[C@H]5O)C(O)[C@H]4O)C(O)[C@H]3O]

In some embodiments, the amount of ring compound, for example, a cyclodextrin or cyclodextrin derivative, on the polymer chain is about 2 wt % to about 60 wt %, such as about 2 wt % to about 55 wt %, about 2 wt % to about 50 wt %, about 2 wt % to about 45 wt %, about 2 wt % to about 40 wt %, about 2 wt % to about 35 wt %, about 2 wt % to about 30 wt %, about 2 wt % to about 25 wt %, about 2 wt % to about 20 wt %, about 2 wt % to about 15 wt %, about 2 wt % to about 10 wt %, about 2 wt % to about 5 wt %, about 5 wt % to about 60 wt %, about 5 wt % to about 55 wt %, about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 60 wt %, about 15 wt % to about 55 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 60 wt %, about 40 wt % to about 55 wt %, about 40 wt % to about 50 wt %, about 40 wt % to about 45 wt %, about 45 wt % to about 60 wt %, about 45 wt % to about 55 wt %, about 45 wt % to about 50 wt %, about 50 wt % to about 60 wt %, about 50 wt % to about 55 wt %, about 55 wt % to about 60 wt %, or about 2 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %. In some embodiments, the amount of ring compound, for example, a cyclodextrin or cyclodextrin derivative, on the polymer chain is about 2 wt % to about 60 wt %. In some embodiments, the amount of ring compound, for example, a cyclodextrin or cyclodextrin derivative, on the polymer chain is about 10 wt % to about 50 wt %. In some embodiments, the amount of ring compound, for example, a cyclodextrin or cyclodextrin derivative, on the polymer chain is about 25 wt % to about 35 wt %.

Hydrophobic and Non-Ionic Groups

In some embodiments, at least one of the linear polymer and the ring compound is substituted (or modified) with a hydrophobic group or a non-ionic group or a combination thereof. The hydrophobic and non-ionic groups can be any group that can modify or be substituted onto a linear polymer or ring compound. Examples of such groups include those described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

In some embodiments, at least one of the linear polymer and ring compound is substituted with a hydrophobic group. Examples of suitable hydrophobic groups include, but are not limited to, alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments, at least one of the linear polymer and ring compound is substituted with a non-ionic group. In some embodiments, the non-ionic group is selected from the group consisting of: an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an —O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—Si—R$^3$ group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

Examples of R, R', R$^1$, R$^2$, R$^3$, and R$^4$ groups include, but are not limited to, alkyl groups such as methyl, ethyl, propyl, butyl, pentyl, hexyl, heptyl, octyl, nonyl, decyl, undecyl, and dodecyl; branched alkyl groups such as isopropyl, isobutyl, tert-butyl, 1-methylpropyl, isoamyl, neopentyl, 1,1-dimethylpropyl, 4-methylpentyl, 2-methylbutyl, and 2-ethylhexyl; cycloalkyl groups such as cyclopropyl, cyclobutyl, cyclopentyl, cyclohexyl, cycloheptyl, cyclooctyl, and adamantyl; cycloalkyl ether groups such as ethylene oxide, oxetane, tetrahydrofuran, tetrahydropyrane, oxepane, dioxane, and dioxolane; and cycloalkyl thioether groups such as thiirane, thietane, tetrahydrothiophene, thiane, dithiolane, and dithiane. In some embodiments, R' is a group resulting from removal of one hydrogen, for example, R' can be a group resulting from removal of one hydrogen in methyl, ethyl, propyl, butyl, pentyl or hexyl.

In some embodiments, the ring compound is substituted with a hydrophobic group, a non-ionic group, or combinations thereof. In some embodiments, the ring compound is a cyclodextrin. In some embodiments, a part or all of the hydroxyl groups (—OH) of the cyclodextrin are substituted with a hydrophobic group or non-ionic group or combination thereof. In some embodiments, a part or all of the hydroxyl groups (—OH) of the cyclodextrin are substituted with a polycaprolactone, a hydroxypropyl group, or both. In some embodiments, substitution of the hydroxyl group with the hydrophobic group or non-ionic group or combination thereof is about 10% to about 100% of the total hydroxyl groups of the total cyclodextrin molecules.

Amount of Inclusion

In some embodiments, where a plurality of ring compounds include a linear polymer such that the linear polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the linear polymer and the thickness of the ring compounds. For example, when the linear polymer is polyethylene glycol and the ring compounds are α-cyclodextrin molecules, the maximum amount of inclusion has been experimentally determined (see, for example, Macromolecules (1993) 26:5698-5703).

Stopper Group

The polyrotaxane of the sliding-ring polymer includes stopper groups disposed at both end terminals of the linear polymer. The stopper groups can be any group that is disposed at the ends of a linear polymer and acts to prevent separation of the ring compounds. Examples of such stopper groups include those described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

Examples of suitable stopper groups include, but are not limited to, dinitrophenyl groups; cyclodextrins; adamantane groups; trityl groups; fluoresceins; pyrenes; benzenes optionally substituted with one or more substituents including, but not limited to, alkyl, alkyloxy, hydroxy, halogen, cyano, sulfonyl, carboxyl, amino, and phenyl; polycyclic aromatics optionally substituted with one or more substituents including, but not limited to, alkyl, alkyloxy, hydroxy, halogen, cyano, sulfonyl, carboxyl, amino, and phenyl; and steroids. In some embodiments, the stopper group is selected from the group consisting of dinitrophenyl groups; cyclodextrins; adamantane groups; trityl groups; fluoresceins; and pyrenes. In some embodiments, the stopper group is adamantane. In some embodiments, the stopper group is trityl.

Cross-Linkers

In some embodiments, at least two molecules of polyrotaxane are chemically bonded by a cross-linking agent. Examples of suitable cross-linking agents include those described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

Linked Polyrotaxanes

In the sliding-ring polymer additives that can be used in the cement compositions of the present disclosure, at least two molecules of polyrotaxane are cross-linked to each other through a chemical bond. When linking polyrotaxane molecules, all of the polyrotaxane molecules can be substituted with the same hydrophobic or non-ionic group. Alternatively, a part of the polyrotaxane molecules can be substituted with one hydrophobic or non-ionic group, and the rest of the polyrotaxane molecules can be substituted with a hydrophobic or non-ionic group that is different from the first group. Moreover, different molecules of polyrotaxane substituted with different hydrophobic or non-ionic groups can be physically linked.

In some embodiments, at least one hydroxyl group of at least one cyclic molecule in each of at least two molecules of polyrotaxane is involved in cross-linking. In some embodiments, at least two molecules of polyrotaxane are chemically bonded by a cross-linking agent.

Additional Components

In some embodiments, the cement composition includes water. In some embodiments, the sliding-ring polymer additive of the present disclosure is dry blended with the cement and mixed with water. In some embodiments, the ratio of cement to water in the cement composition is about 50:50 wt/v, about 55:45 wt/v, about 60:40 wt/v, about 65:35 wt/v, or about 70:30 wt/v, inclusive.

In some embodiments, the cement composition contains a suspending agent. Suitable suspending agents include, but are not limited to, polymers, hydroxyethylcellulose, polyacrylates, hydrophilic polymers, for example, cellulose derivatives, block co-polymers of ethylene glycol and propylene glycol, and mixtures of these polymers. The suspending agent can be about 0.01% to about 2.5% by weight of the cement, for example, about 0.01% to about 1%, about 0.1% to 1%, about 0.2% to about 0.5% by weight of the cement, or about 0.01%, about 0.05%, about 0.06%, about 0.1%, about 0.2%, about 0.3%, about 0.4%, about 0.5%, about 0.75%, about 1%, about 1.25%, about 1.5%, about 1.75%, or about 2% by weight of the cement. In some embodiments, when a suspending agent is present, the amount is about 0.01% to about 0.06% by weight of the cement, such as about 0.01%, about 0.05%, or about 0.06% by weight of the cement. In some embodiments, the suspending agent is hydroxyethylcellulose sold as Natrosol™ (Ashland Specialty Ingredients, Wilmington, DE).

Cement

The compositions of the present application contain cement and a sliding-ring polymer additive. The cement can be any type of cement used in the construction of subterranean oil and gas wells, or any cement used in above-ground cement construction applications. In some embodiments, the cement is Portland cement. Examples of cements that can be used in the compositions include, but are not limited to Class A, Class B, Class G, and Class H cements.

In some embodiments, the amount of sliding-ring polymer additive in the cement composition is about 0.1 wt % to about 6 wt %, such as about 0.1 wt % to about 5.5 wt %, about 0.1 wt % to about 5 wt %, about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, about 0.5 wt % to about 6 wt %, about 0.5 wt % to about 5.5 wt %, about 0.5 wt % to about 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to about 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to about 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to about 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to about 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to about 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to about 5 wt %, about 3.5 wt % to about 4.5 wt %, about 3.5 wt % to about 4 wt %, about 4 wt % to about 6 wt %, about 4 wt % to about 5.5 wt %, about 4 wt % to about 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, about 5.5 wt % to about 6 wt %, or about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, or about 6 wt %. In some embodiments, the amount of sliding-ring polymer additive in the cement composition is about 0.1 wt % to about 6 wt %. In some embodiments, the amount of sliding-ring polymer additive in the cement composition is about 1 wt % to about 4 wt %. In some embodiments, the amount of sliding-ring polymer additive in the cement composition is about 2 wt % to about 3 wt %. In some embodiments, the amount of sliding-ring polymer additive in the cement composition is about 1 wt %. In some embodiments, the amount of sliding-ring polymer additive in the cement composition is about 2 wt %. In some embodiments, the amount of sliding-ring polymer additive in the cement composition is about 3 wt %.

Properties of the Cement Composition

In some embodiments, addition of the sliding-ring polymer additive to the cement does not decrease the compressive strength of the cement as compared to the same composition without the sliding-ring polymer additive. In some embodiments, addition of the sliding-ring polymer additive to the cement does not decrease the compressive strength of the cement by more than about 200 pounds per square inch (psi) to about 1000 psi as compared to the compressive strength of the same cement without addition of the sliding-ring polymer additive. For example, the compressive strength of the cement does not decrease by more than about 200 psi, about 300 psi, about 400 psi, about 500 psi, about 600 psi, about 700 psi, about 800 psi, about 900 psi, or about 1000 psi as compared to the compressive strength of the same cement without addition of the sliding-ring polymer additive. In some embodiments, the cement composition containing the sliding-ring polymer additive has a compressive strength of about 1000 psi to about 15,000 psi, about 2000 psi to about 10,000 psi, or about 6500 psi to about 8500 psi, at a pressure of about 0.1 megapascal (MPa) to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 7800 psi to about 9500 psi at a pressure of about 20 MPa and a temperature of about 180° F.

In some embodiments, the cement composition of the present application exhibits improved toughness or stiffness when exposed to severe conditions (for example, extreme temperatures, pressures, or both). For example, the cement composition can exhibit improved elastic properties, such as a reduction in the Young's modulus, without exhibiting a substantial change in the compressive strength of the composition (for example, a decrease of the compressive strength of the cement by more than about 200 psi to about 1000 psi), after exposure to elevated temperatures, pressures, or both. In some embodiments, the cement composition containing a sliding-ring polymer additive exhibits a reduction of the Young's modulus of about 5% to about 30%, such as about 10% to about 25%, about 15% to about 20%, about 10% to about 20%, about 10% to about 30%, about 15% to about 30%, about 15% to about 25%, or a reduction of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%, without exhibiting a substantial change in the compressive strength of the composition (for example, a decrease of the compressive strength of the cement by more than about 200 psi to about 1000 psi), after exposure of the cement composition to elevated temperatures, as compared to the Young's modulus and compressive strength of the cement composition prior to exposure to the elevated temperatures.

In some embodiments, the cement composition of the present disclosure exhibits improved elastic properties as compared to the same composition without the sliding-ring polymer additive. In some embodiments, the cement composition containing the sliding-ring polymer additive has a Young's modulus of about 0.1 gigapascal (GPa) to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments, addition of a sliding-ring polymer additive does not affect the rheological properties, for example, the viscosity of the cement composition. For example, the viscosity of the cement formulation is comparable to the viscosity of a cement formulation that does not contain any of the sliding-ring polymeric additive.

Method of Preparing a Cement Composition

Provided in the present application is a method of preparing a cement composition, such as a cement composition described in this application. In some embodiments, the method including mixing a sliding-ring polymer additive with cement. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

In some embodiments, the cement slurry thus obtained is poured into a mold and cured. For example, the mold can be a 1-inch (diameter)/2-inch (length) mold. In some embodiments, the cement composition is cured at about 100° F. to about 450° F., such as about 200° F. to about 400° F., or about 300° F. under pressure of about 15 psi to about 10,000 psi, such as about 100 psi to about 5000 psi, or about 3000 psi.

Methods of Using the Cement Composition Containing a Sliding-Ring Polymer Additive Provided in this disclosure is a method for preventing or inhibiting the formation of micro-cracks and fractures in the cement of an oil well. In some embodiments, the method includes providing to the oil well a cement composition containing cement and a sliding-ring polymer additive as described in the present disclosure. In some embodiments, the sliding-ring polymer additive contains at least two molecules of a polyrotaxane that are cross-linked to each other through a chemical bond, the polyrotaxane including a linear polymer; at least one ring compound, where the linear polymer is threaded through the opening of the ring compound; and stopper groups disposed at both end terminals of the linear polymer. In some embodiments, at least one of the linear polymer and the ring compound is substituted with a hydrophobic or non-ionic group or combination thereof. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

Also provided is a method for providing long-term zonal isolation in oil wells (that is, subterranean formations) including providing to an oil well a cement composition that contains cement and a sliding-ring polymer additive such as described in this disclosure. In some embodiments, the sliding-ring polymer additive contains at least two molecules of a polyrotaxane that are cross-linked to each other through a chemical bond, the polyrotaxane including a linear polymer; at least one ring compound, where the linear polymer is threaded through the opening of the ring compound; and stopper groups disposed at both end terminals of the linear polymer. In some embodiments, at least one of the linear polymer and the ring compound is substituted with a hydrophobic or non-ionic group or combination thereof. In some embodiments, the sliding-ring polymer additive is as described in any one of U.S. Pat. Nos. 7,612,142; 7,622,527; 7,799,867; 7,847,049; 7,893,168; 7,943,718; 7,981,943; 8,007,911; 8,017,688; 8,450,415; 8,580,906; 9,068,051; and 9,266,972; each of which is incorporated by reference in its entirety.

In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the sliding-ring polymer additive improves the stiffness of the well cement. In some embodiments, the cement composition containing the sliding-ring polymer additive is stable in downhole conditions. In some embodiments, the sliding-ring polymer additive allows for uniform distribution of the stresses experienced in the cement matrix, thus enhancing the properties of the cement.

In some embodiments, the sliding-ring polymer additives of the present disclosure are employed as additives in cements for oil well construction. In some embodiments, these additives also provide similar improvement in cements used for other construction applications, for example, construction of roads, buildings, bridges, and any other application where cements can be utilized.

EXAMPLES

Figure 3A:
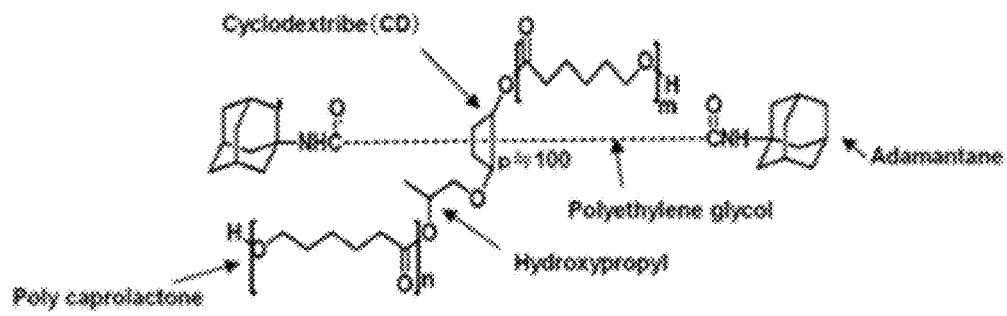
FIGS. 3A and 3B show the chemical structure of representative starting polyrotaxane components (the structural detailed can be found on Advanced Softmaterials, Inc., Japan). These components were cross-linked to obtain sliding-ring polymer additives.
Figure 3B:
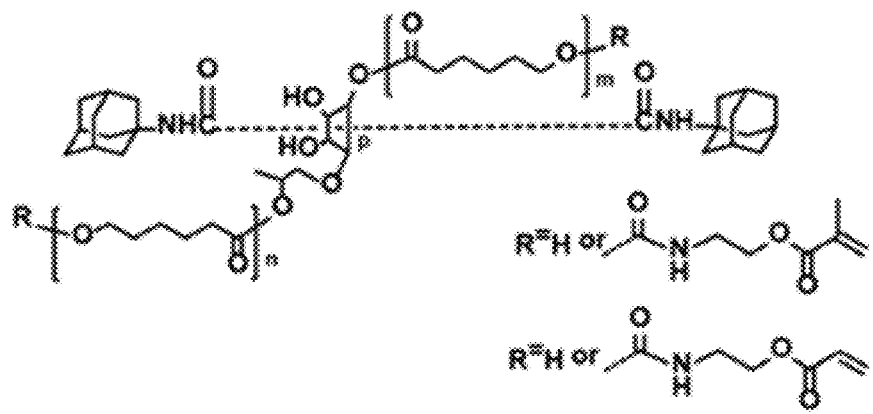

Example 1—Preparation of Cement Slurries Containing Sliding-Ring Polymer Additive Four cement formulations were prepared (Cements A-D) that included Class G cement, a suspending agent, and water. Cements B-D also included the sliding-ring polymer additive SH2400B-0501 or SH2400B-2001 (Advanced Softmaterials Inc., Chiba, Japan). These polymers are cross-linked microparticles containing SeRM® Super Polymer, a cross-linked polyrotaxane polymer. SH2400B-051 has a particle size of 7 μm and SH2400B-2001 has a particle size of 20 μm. The chemical structures shown in FIGS. 3A-3B are the basic components used before cross-linking and the specifications the of cross-linked polymers are shown in Table 1.

TABLE 1

SH2400B-2001 and SH2400B-500B additive specifications

|  | SH2400B-2001 | SH2400B-051 |
|---|---|---|
| Average grain size[1] | 20 μm | 7 μm |
| Absolute specific gravity[2] (He substitution method) | 1.16 g/cc | 1.16 g/cc |
| Reflective index[2] | 1.50 | 1.50 |
| Decomposition temperature[2] | 306° C. | 306° C. |

[1]median size (d50)
[2]representative value

Cement formulations A-D were prepared as follows. Cement A was prepared by blending Class G cement with a suspending agent. The blended cement mixture was added to water at 8000 rpm, followed by mixing at 12000 rpm for 35 seconds. The cement slurry was poured into a 1"-diameter cylinder and was cured at 180° F. and 3000 psi for 5 days. The cement samples of 1'/2" size were used for mechanical testing.

Cements B, C, and D were prepared by blending Class G cement with the suspending agent hydroxyethylcellulose (Natrosol™, Ashland Specialty Ingredients, Wilmington, DE) and SH2400B-0501 (1%, 2%, and 3% by weight of cement (bwoc) for Cements B, C, and D, respectively). The blended cement mixture was added to water at 8000 rpm, followed by mixing at 12000 rpm for 35 seconds. The cement slurry was poured into a 1"-diameter cylinder and was cured at 180° F. and 3000 psi for 5 days. The cement samples of 1'/2" size were used for mechanical testing. Table 2 shows the components and amounts for each of the cement formulations.

TABLE 2

Cement formulations

| Formulations | Components | Amount (g) | % bwoc |
|---|---|---|---|
| Cement A | Class G cement | 205.8 | |
|  | Suspending agent | 0.82 | 0.4 |
|  | Water | 136.2 | |
| Cement B | Class G cement | 205.8 | |
|  | Suspending agent | 0.82 | 0.4 |
|  | SH2400B-0501 | 2.06 | 1 |
|  | Water | 136.2 | |
| Cement C | Class G cement | 205.8 | |
|  | Suspending agent | 0.82 | 0.4 |
|  | SH2400B-0501 | 4.11 | 2 |
|  | Water | 136.2 | |
| Cement D | Class G cement | 205.8 | |
|  | Suspending agent | 0.82 | 0.4 |
|  | SH2400B-0501 | 6.2 | 3 |
|  | Water | 136.2 | |

Example 2—Determination of the Rheological Properties of Cement Containing a Sliding-Ring Polymer Additive The rheological properties of Cements A-D (prepared according to Example 1) were tested and measured using a Couette coaxial cylinder rotational viscometer (Fann Instrument Company, Houston, TX). Table 3 shows the rheological properties at 75° F. under ambient pressure for Cements A, B, C, and D. "Up" indicates that the dial reading was recorded while increasing the rpm from 3 to 600 and "down" indicates that the dial reading was recorded while decreasing the rpm from 600 to 3.

TABLE 3

Rheological properties of Cements A-D

| RPM | Cement A up (cP) | Cement A down (cP) | Cement B up (cP) | Cement B down (cP) | Cement C up (cP) | Cement C down (cP) | Cement D up (cP) | Cement D down (cP) |
|---|---|---|---|---|---|---|---|---|
| 3 | 12 | 10 | 14 | 12 | 17 | 15 | 18 | 17 |
| 6 | 20 | 15 | 23 | 17 | 28 | 20 | 25 | 21 |
| 100 | 105 | 98 | 110 | 100 | 128 | 116 | 125 | 103 |
| 200 | 150 | 147 | 157 | 154 | 182 | 164 | 175 | 158 |
| 300 | 188 | 180 | 194 | 195 | 217 | 209 | 210 | 203 |
| 600 | 275 | | 290 | | 299 | | 299 | |

As can be seen in Table 3, the addition of the sliding-ring polymer additive did not affect the viscosity of the cements, as the viscosity was comparable to the viscosity of the cement formulation that did not contain any of the sliding-ring polymeric additive (Cement A). The values at the lower rpm (3 rpm and 6 rpm) demonstrate that the gel strength or viscosity is sufficient to suspend cement particles, as values above about 8 or 9 are typically considered acceptable for cement formulations. The values at the higher rpm (300 rpm and 600 rpm) suggest that the pumpability of the cement will not be a limiting factor upon addition of these polymeric additives to cement.

Figure 4:
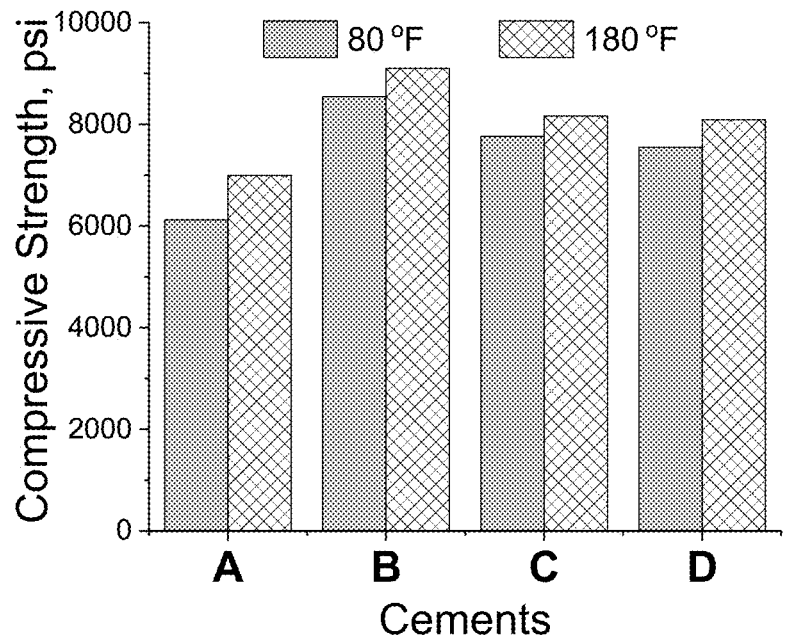
FIG. 4 is a graph illustrating the compressive strength of cement formulations with or without a sliding-ring polymeric additive at 80° F. and 180° F. under confined pressure of 20 MPa.

Example 3—Determination of the Compressive Strengths of Cement Containing a Sliding-Ring Polymer Additive The compressive strength of Cements A-D (prepared according to Example 1) were tested. Table 4 and FIG. 4 show the compressive strength at 80° F. and 180° F. under confined pressure of 20 MPa for Cements A, B, C, and D.

Static confined measurements provided the assessment of cement under hydrostatic and triaxial loading at variable pressure and temperatures. The study was carried out with a laboratory instrument, Autolab 3000 (New England Research; White River Junction, VT), a high-pressure tri-axial press capable of generating confining pressures. The test equipment consisted of an axial loading system, a confining pressure supply system, and data acquisition software. These measurements required cylindrical samples with a diameter of two inches and a length of four inches. The specimens were jacketed and placed between steel end-caps. Static mechanical properties were measured using strain gauge sensors, which were mounted on the sample to measure axial deformation and radial deformation. A series of laboratory tests were performed to examine the fatigue behavior of cement when subjected to cyclic loading under triaxial compression conditions. After the sample was placed in a triaxial cell, a confining pressure was applied. The cyclic axial load was applied in the form of triangular waveforms. Each sample was deformed over three cyclic loading series. In each cyclic loading series, a differential stress was applied during the cyclic loading; and various peak axial stresses are applied during cyclic loading. Because uniaxial stress was applied on the sample, this module was used to calculate Young's modulus and Poisson's ratio to measure sample strain.

TABLE 4

Compressive strengths of Cements A-D

| | Compressive strength (psi) | |
|---|---|---|
| Set-cement samples | 80° F. | 180° F. |
| Cement A | 6121 | 6990 |
| Cement B | 8543 | 9100 |
| Cement C | 7763 | 8163 |
| Cement D | 7544 | 8087 |

The cement without the polymer additive (Cement A) showed compressive strength of 6121 and 6990 psi at 80° F. and 180° F., respectively. Higher compressive strength was observed in the cements containing the polymeric additive (Cements B-D), indicating that the compressive strength of the cement was not affected by incorporating the sliding-ring polymeric additive.

Figure 5:
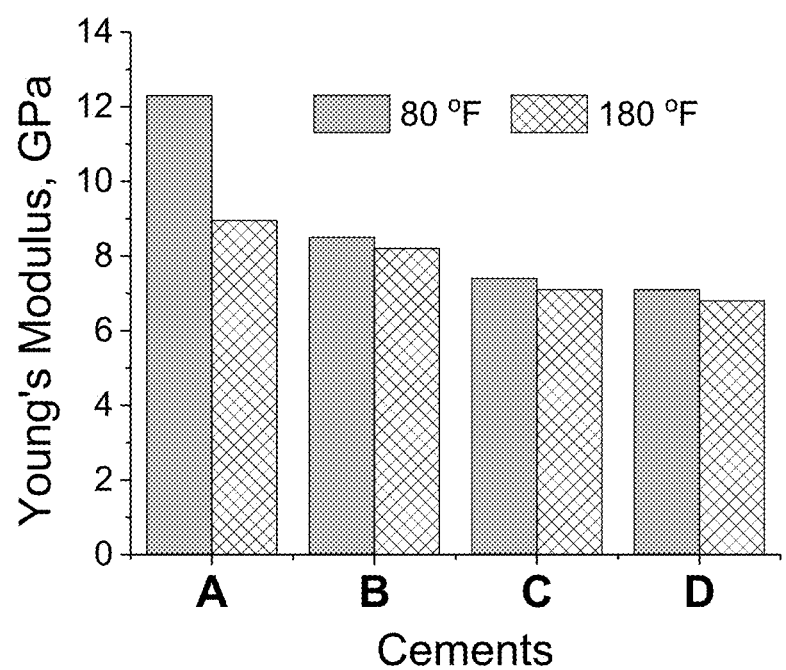
FIG. 5 is a graph illustrating the Young's modulus of cement formulations with or without a sliding-ring polymeric additive at 80° F. and 180° F. under confined pressure of 20 MPa.

Example 4—Determination of the Elastic Characteristics of Cement Containing a Sliding-Ring Polymer Additive The Young's modulus of Cements A-D (prepared according to Example 1) was measured as described in Example 3 in order to determine the elastic characteristics of the cement formulations. Table 5 and FIG. 5 show the Young's modulus at 80° F. and 180° F. under confined pressure of 20 MPa for Cements A, B, C, and D.

TABLE 5

Young's modulus of Cements A-D

| | Young's modulus (GPa) | |
|---|---|---|
| Set-cement samples | 80° F. | 180° F. |
| Cement A | 12.3 | 10.95 |
| Cement B | 8.5 | 8.2 |
| Cement C | 7.4 | 7.1 |
| Cement D | 7.1 | 6.8 |

The cement without the sliding-ring polymer additive (Cement A) showed Young's modulus of 12.3 and 10.95 GPa at 80° F. and 180° F., respectively. The cement formulations with the polymeric additive (Cements B, C, and D) demonstrated a reduction in Young's modulus. The reduction in the Young's modulus for Cements B, C and D as compared to Cement A show that the elastic properties of the cement were improved upon addition of the sliding-ring polymer additive.

What is claimed is:

1. A method for preventing the formation of micro-cracks and fractures in the cement of an oil well, the method comprising providing to the oil well a cement composition comprising cement and a sliding-ring polymer additive, the sliding-ring polymer additive comprising at least two molecules of a polyrotaxane, wherein the polyrotaxane comprises:
   a linear polymer;
   at least one ring compound, wherein the linear polymer is threaded through the opening of the ring compound; and stopper groups disposed at both end terminals of the linear polymer;
wherein at least one of the linear polymer and the ring compound is substituted with a hydrophobic or non-ionic group or combination thereof; and
the at least two molecules of polyrotaxane are cross-linked to each other through a chemical bond.

2. The method of claim 1, wherein the linear polymer is selected from the group consisting of polyvinyl alcohol, polyvinylpyrrolidone, poly(meth)acrylic acid, a cellulose-based resin, polyacrylamide, polyethylene oxide, polyethylene glycol, polypropylene glycol, a polyvinyl acetal-based resin, polyvinyl methyl ether, polyamine, polyethyleneimine, casein, gelatin, starch, a polyolefin-based resin, a polyester resin, a polyvinyl chloride resin, a polystyrene-based resin, an acrylic resin, a polycarbonate resin, a polyurethane resin, a vinyl chloride-vinyl acetate copolymer resin, a polyvinylbutyral resin, polyisobutylene, polytetrahydrofuran, polyaniline, acrylonitrile-butadiene-styrene copolymer (ABS resin), a polyamide, a polyimide, a polydiene, a polysiloxane, a polysulfone, a polyimine, a polyacetic anhydride, a polyurea, a polysulfide, a polyphosphazene, a polyketone, a polyphenylene, a polyhaloolefin; and derivatives and copolymers thereof.

3. The method of claim 2, wherein the linear polymer is selected from the group consisting of polypropylene glycol, polytetrahydrofuran, polydimethylsiloxane, polyethylene and polypropylene copolymer, and polyethylene glycol.

4. The method of claim 3, wherein the linear polymer is polyethylene glycol.

5. The method of claim 1, wherein the linear polymer has a molecular weight of about 2000 g/mol to about 50,000 g/mol, about 8000 g/mol to about 30,000 g/mol, about 15,000 g/mol to about 25,000 g/mol, or about 10,000 g/mol to about 50,000 g/mol.

6. The method of claim 1, wherein the linear polymer has a molecular weight greater than about 10,000 g/mol, greater than about 20,000 g/mol, or greater than about 35,000 g/mol.

7. The method of claim 1, wherein the ring compound comprises one or more of an —OH group, an —$NH_2$ group, a —COOH group, an epoxy group, a vinyl group, a thiol group, a photo-crosslinkable group, and combinations thereof.

8. The method of claim 7, wherein the photo-crosslinkable group is selected from the group consisting of cinnamic acid, coumarin, chalcone, anthracene, styrylpyridine, styrylpyridinium salt, and styrylquinolium salt.

9. The method of claim 7, wherein the ring compound is a cyclodextrin or cyclodextrin derivative.

10. The method of claim 9, wherein the cyclodextrin is selected from the group consisting of α-cyclodextrin (α-CD), β-cyclodextrin (β-CD), and γ-cyclodextrin (γ-CD) and combinations thereof.

11. The method of claim 9, wherein the ring compound is a cyclodextrin and a part or all of the hydroxyl groups (—OH) of the cyclodextrin is substituted with a hydrophobic group or non-ionic group or combination thereof.

12. The method of claim 11, wherein substitution of the hydroxyl group with the hydrophobic group or non-ionic group or combination thereof is about 10% to about 100% of the total hydroxyl groups of the total cyclodextrin molecules.

13. The method of claim 9, wherein at least one hydroxyl group of at least one cyclodextrin molecule in each of the at least two molecules of polyrotaxane is involved in cross-linking.

14. The method of claim 1, wherein the ring compound has an inclusion amount ranging from 0.001 to 0.61 relative to 1 which is the maximum inclusion amount of the ring compound capable of being included by the linear polymer.

15. The method of claim 1, wherein the stopper group is selected from the group consisting of a dinitrophenyl, a cyclodextrin, adamantane, trityl, a fluorescein, a pyrene, a substituted benzene, a polycyclic aromatic, and steroids.

16. The method of claim 15, wherein the stopper group is adamantane or trityl.

17. The method of claim 1, wherein the hydrophobic group is selected from the group consisting of alkyl group, benzyl group, benzene derivative-containing group, acyl group, silyl group, trityl group, tosyl group, a polymer, and groups bonded through a urethane bond, ester bond or ether bond.

18. The method of claim 17, wherein the polymer is a polycaprolactone.

19. The method of claim 1, wherein the non-ionic group is selected from the group consisting of:
an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;
an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —$NH_2$ or —SH;
an —O—CO—NH—$R^1$ group, wherein $R^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;
an —O—CO—$R^2$ group, wherein $R^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;
an —O—Si—$R^3$ group, wherein $R^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and
an —O—CO—O—$R^4$ group, wherein $R^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

20. The method of claim 1, wherein the at least two molecules of polyrotaxane are chemically bonded by a cross-linking agent.

21. The method of claim 20, wherein the cross-linking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

22. The method of claim 1, wherein the sliding-ring polymer additive comprises a polyrotaxane wherein the linear polymer is polyethylene glycol having a molecular weight of about 20,000 g/mol; the ring compound is a cyclodextrin wherein a part or all of the hydroxyl groups (—OH) of the cyclodextrin are substituted with a hydrophobic group or non-ionic group or combination thereof; and the stopper groups are adamantane.

23. The method of claim 22, wherein a part or all of the hydroxyl groups (—OH) of the cyclodextrin are substituted with a polycaprolactone, a hydroxypropyl group, or both.

24. The method of claim 1, wherein the amount of sliding-ring polymer additive in the cement composition is between about 0.1% to about 6%, about 1% to about 4%, or about 2% to about 3% by weight of the cement composition.

25. The method of claim 24, wherein the amount of sliding-ring polymer additive in the cement composition is about 1%, about 2%, or about 3% by weight of the cement composition.

26. The method of claim 1, wherein the cement composition comprises a suspending agent.

27. The method of claim 26, wherein the suspending agent is selected from the group consisting of a polymer, hydroxyethylcellulose, a polyacrylate, a hydrophilic polymer, a cellulose derivative, a block co-polymer of ethylene glycol and propylene glycol, and mixtures of these polymers.

28. The method of claim 1, wherein the cement composition further comprises water.

29. The method of claim 28, wherein the ratio of cement to water in the cement composition is about 50:50, about 60:40, or about 70:30 wt/v.

* * * * *

UNITED STATES PATENT AND TRADEMARK OFFICE
CERTIFICATE OF CORRECTION

| | |
|---|---|
| PATENT NO. | : 11,760,915 B2 |
| APPLICATION NO. | : 17/675429 |
| DATED | : September 19, 2023 |
| INVENTOR(S) | : Hasmukh A. Patel, Peter Boul and Carl Thaemlitz |

It is certified that error appears in the above-identified patent and that said Letters Patent is hereby corrected as shown below:

In the Claims

In Column 28, Line 46, Claim 19, please replace "alky 1" with -- alkyl --.

Signed and Sealed this
Fifth Day of November, 2024

Katherine Kelly Vidal
*Director of the United States Patent and Trademark Office*